United States Patent
Bacalia

(10) Patent No.: US 8,276,744 B2
(45) Date of Patent: Oct. 2, 2012

(54) SKILLET CONVEYOR DRIVE ADJUSTING METHOD AND TOOL

(75) Inventor: Christopher E. Bacalia, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/535,058

(22) Filed: Aug. 4, 2009

(65) Prior Publication Data

US 2011/0031093 A1 Feb. 10, 2011

(51) Int. Cl.
*B65G 47/00* (2006.01)
(52) U.S. Cl. .................. 198/617; 198/781.04
(58) Field of Classification Search ............. 198/781.04, 198/617
See application file for complete search history.

(56) References Cited

U.S. PATENT DOCUMENTS

| | | | |
|---|---|---|---|
| 3,610,406 A * | 10/1971 | Fleischauer et al. ......... | 198/789 |
| 4,006,815 A * | 2/1977 | Werntz ..................... | 198/781.04 |
| 4,103,769 A * | 8/1978 | Jorgensen ................ | 198/781.04 |
| 4,233,053 A * | 11/1980 | Nitschke ......................... | 65/163 |
| 4,421,224 A * | 12/1983 | Dingman ................. | 198/781.02 |
| 4,448,302 A * | 5/1984 | Weaver et al. ........... | 198/781.02 |
| 4,473,149 A * | 9/1984 | Vogt et al. ................ | 198/781.04 |
| 4,500,287 A * | 2/1985 | Carraroli et al. ............. | 432/246 |
| 4,733,772 A * | 3/1988 | Potter ....................... | 198/781.04 |
| 4,993,541 A * | 2/1991 | Roh .......................... | 198/781.02 |
| 5,147,024 A * | 9/1992 | Yamada ................... | 198/781.02 |
| 5,456,349 A * | 10/1995 | Axmann ....................... | 198/831 |
| 6,422,378 B1* | 7/2002 | Allgaier ................... | 198/781.03 |
| 6,868,961 B2* | 3/2005 | Ehlert et al. ............. | 198/781.04 |
| 7,290,649 B2* | 11/2007 | Wolkerstorfer .......... | 198/781.05 |
| 7,594,572 B2* | 9/2009 | Vogl et al. ................ | 198/781.11 |

* cited by examiner

*Primary Examiner* — Joseph A Dillon, Jr.

(57) ABSTRACT

A method and a tool are provided for adjusting a skillet conveyor drive having a motor-driven drive wheel mounted on an adjustable mounting mechanism including a threaded rod that is biased toward the skillet by a spring mechanism and wherein the compression of the spring is adjusted by rotating an adjusting nut. The method includes pulling on the threaded rod, measuring the force required for the pulling by reading a load cell indicator, using a look up table to correlate the measured force with a desired force, and then adjusting the nut to achieve the desire force. The tool can be removed and then moved to another skillet conveyor drive.

5 Claims, 4 Drawing Sheets

ND TOOL

FIELD OF THE INVENTION

The present invention relates to the adjustment of skillet conveyor drives and more particularly provides a method for adjusting the force with which a urethane drive wheel is applied against the side of a skillet carrying a vehicle in an assembly plant.

BACKGROUND OF THE INVENTION

Modern vehicle assembly plants often employ skillet conveyors to move vehicles along an assembly line. Assembly workers are stationed along the assembly line and perform the various operations involved in assembly of the vehicles.

A skillet conveyor includes a large platform, known as a skillet, which is about the size of the vehicle that is to be conveyed. A large number of these skillets are placed end-to-end, single file, engaging with one another, and ride along a track that is recessed into the floor of the assembly plant.

The continuous row of individual skillets is driven along the track by skillet drives that are provided at intervals along the track as the track winds its way though the assembly plant. Each skillet drive includes a motor unit that rotates a urethane drive wheel that is pressed against the side of the skillet. Rotation of the urethane drive wheel will thus propel the skillet along the track. Accordingly, the drive wheels need to be pressed against the sides of the platform with sufficient force that the rotation of the drive wheels will reliably move the heavy skillet along the track.

The skillet drive units typically include mounting of the motor and urethane drive wheel on a cantilever support or other moveable mounting arrangement to permit the motor unit and drive wheel to be adjustably moved toward and away from the skillet in order to either increase or decrease the pressure of the drive wheel against the side of the skillet. The magnitude of the pressure is determined by a spring mechanism such as a beveled washer spring pack that resiliently urges the cantilever support in the direction toward the skillet.

During the installation and maintenance of the skillet conveyor system in the assembly plant, the spring pack is adjusted to the requisite force by measuring the compression of the spring pack. For example, if the spring pack has a spring compression rate of 2500 pounds per inch of compression, and it is determined that a wheel load of 1250 pounds is desired for conveying the weight of the skillet and the vehicle body carried by the skillet, then the drive unit will be adjusted so that the drive wheel is pressed against the skillet with 0.5 inch of compression of the spring pack.

The typical vehicle assembly plant will have dozens of these skillet drives that need to be adjusted from time to time and It would be desirable to provide a new and improved method for adjusting the force load of the drive wheel against the skillet.

SUMMARY OF THE INVENTION

A method for adjusting a skillet conveyor drive having a motor-driven drive wheel mounted on an adjustable mounting mechanism including a threaded rod that is biased toward the skillet by a spring mechanism and wherein the compression of the spring is adjusted by rotating an adjusting nut, includes the steps of:

determining the desired pounds of force by which the drive wheel should be forced against the skillet to obtain optimal operation of the skillet conveyor;

pulling on the adjusting rod to compress the spring mechanism just enough to move the drive wheel away from engagement with the skillet;

measuring the pounds of force that was needed to pull the adjustment rod to move the drive wheel away from engagement with the skillet;

referring to a look up table that correlates a measured pounds of force at the condition in which the drive wheel is pulled away from engagement to the corresponding pounds of force that will be applied to the skillet when that compressive force is subsequently released by relieving the pulling on the adjusting rod to again let the drive wheel engage the skillet;

and adjusting the adjusting nut as needed to adjust the measured pounds of force to that level which when the pulling of the adjusting rod is released will apply the drive wheel to the skillet at the earlier determined desired pounds of force by which the drive wheel should be forced against the skillet to obtain optimal operation of the skillet conveyor.

The adjusting tool includes a tubular housing; legs that support the tubular housing against the fixed support, a piston within the tubular housing and having a threaded stem that is pulled by tightening a hex nut; and a load cell that is interposed between the hex nut and the tubular housing to measure the force that is needed to pull on the adjusting rod to compress the spring mechanism just enough to move the drive wheel away from engagement with the skillet.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is exemplary in nature and is not intended to limit the invention, its application, or uses.

Figure 1:
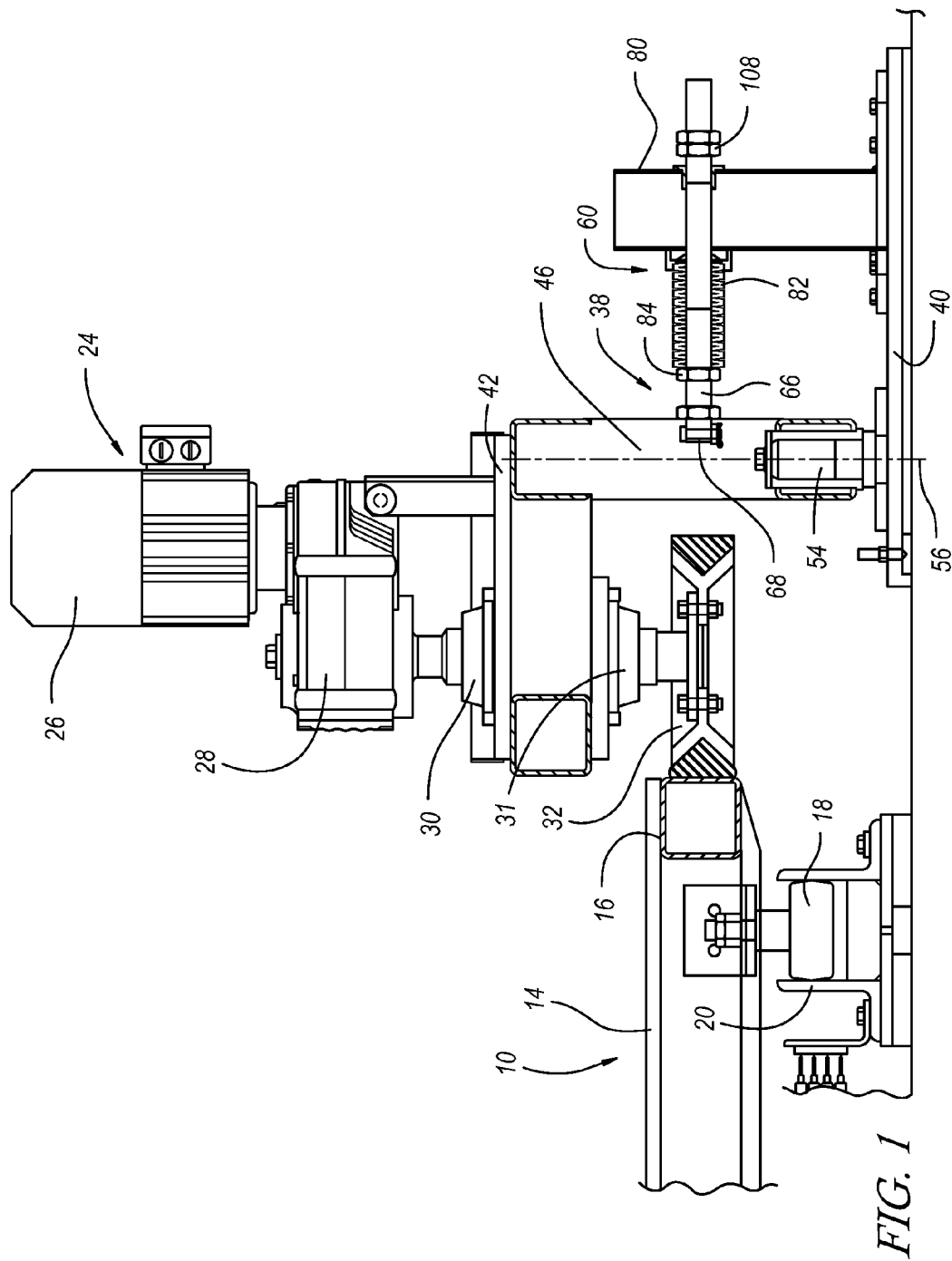
FIG. 1 is a side elevation view of a typical skillet drive assembly.

Referring to FIG. 1, a skillet conveyor is shown and generally indicated at 10. The skillet conveyor includes a large platform or skillet 14 that is rectangular in shape and bordered by a square tube 16. The skillet 14 is mounted on the floor of a vehicle assembly plant by a plurality of rollers, one of which is shown at 18. These rollers 18 can either be attached to the bottom of the skillet 14 and roll in a track 20, or the rollers 18 can be rotatably mounted on the track 20 via bearings and the platform 14 rides along the rollers 18. In either case, the skillet 14 is mounted for rolling movement along a path that is defined by the track 20. FIG. 1 shows only one side of the skillet 14, it being understood that similar rollers and guide track arrangement are provided on the other side of the skillet 14.

FIG. 1 shows a drive assembly 24 that will drive the skillet 14 along the track 20. The drive assembly 24 includes a motor 26, a gear reducer 28, and bearings 30 and 31 that cooperate to rotate a urethane drive wheel 32. The drive wheel 32 bears against the tube 16 of the skillet 14. FIG. 1 shows the drive assembly 24 on the right hand side of the skillet 14 and it will be understood that an identical drive assembly is provided on the left side of the skillet 14 and has a similar urethane drive wheel enaging the skillet 14. As an alternative, in some cases, an idler wheel, not driven by a motor, can be provided opposite the drive wheel 32 to press against the skillet 14. Thus, rotation of the drive wheels 32 will cause the skillet 14 to travel along the track 20, and thus, the drive wheels 32 need to be pressed against the sides of the skillet 14 with sufficient force that the rotation of the drive wheels 32 will reliably move the heavy skillet 14 along the track 20.

Figure 2:
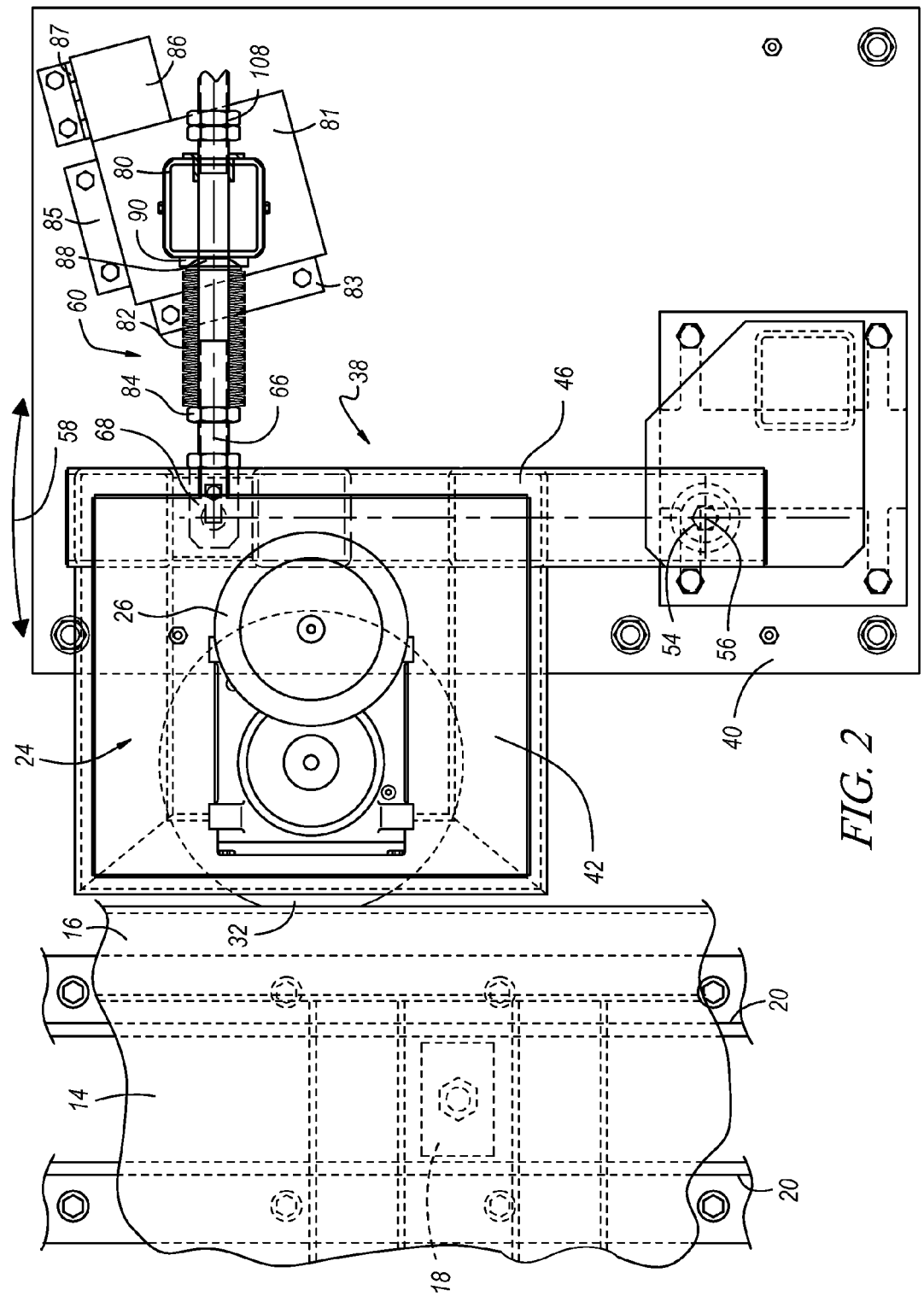
FIG. 2 is a plan view of the skillet drive of FIG. 1.

Referring to FIGS. 1 and 2, the drive assembly 24 is mounted on a mounting mechanism, generally indicated at 38, that will allow the drive assembly 24 to move to the left and right in FIGS. 1 and 2 to adjust the position of the drive wheel 32 against the skillet 14. The mounting mechanism 38 includes a floor plate 40 mounted on the floor, a platform 42 upon which the motor 26, gear reducer 28 and bearings 30 are mounted, and a cantilever support 46. The platform 42 is mounted on the top of the cantilever support 46, and the bottom of the cantilever support 46 is mounted on the floor plate 40 by a pivot shaft 54. The pivot shaft 54 establishes a pivot axis 56 about which the cantilever support 46 and the drive assembly 24 can be swung in the direction of arc 58, FIG. 2, to move the drive wheel 32 toward the skillet 14 or away from the skillet 14. This movement will control and adjust the force of the drive wheel 32 against the skillet 14.

Figure 3:
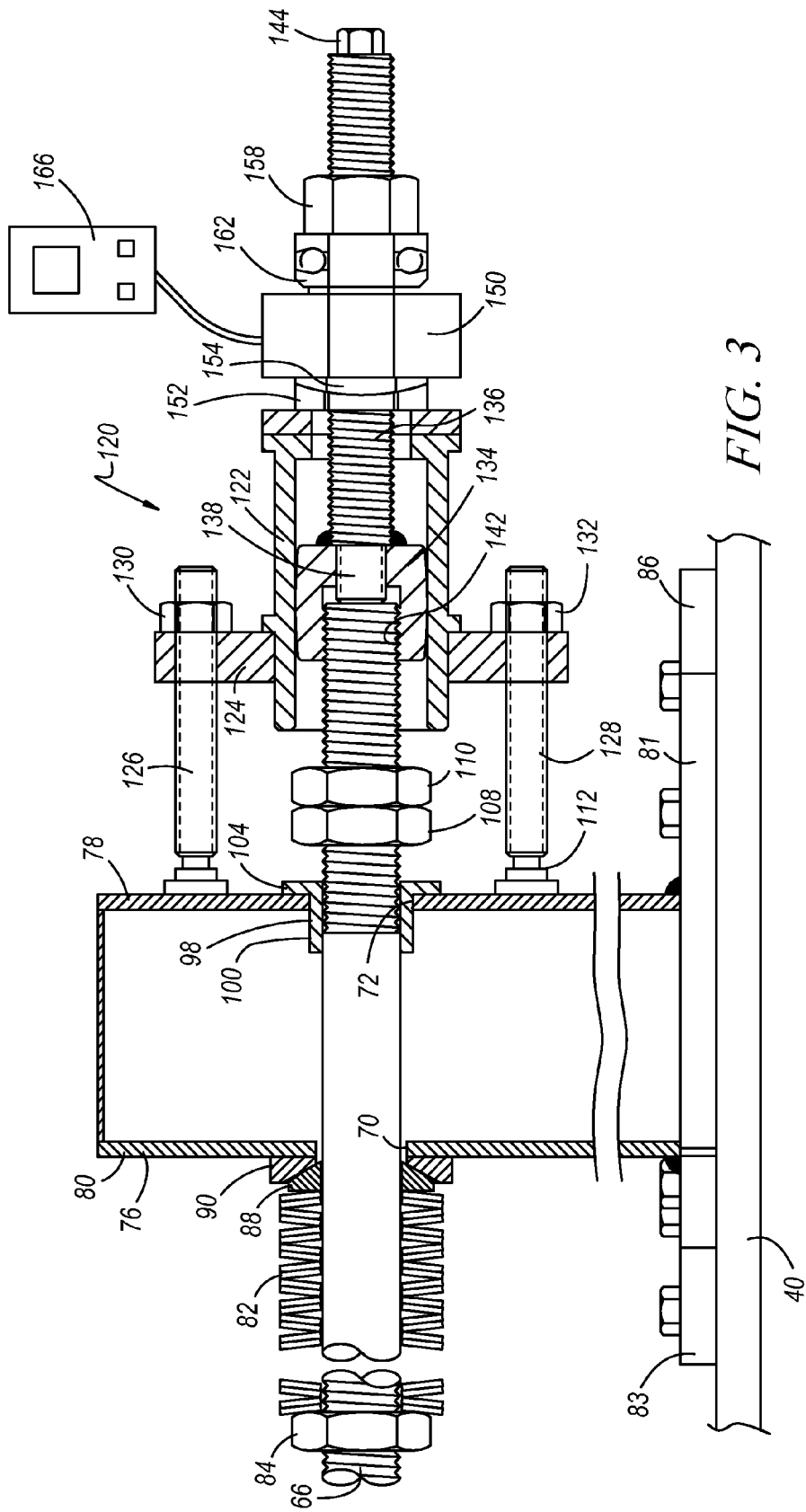
FIG. 3 is a side elevation view of the adjusting rod of the skillet drive of FIGS. 1 and 2 and shows an adjustment tool used to adjust the skillet drive.

As seen in FIGS. 1, 2, and 3, the position of the cantilever support 46 is established by an adjusting rod assembly generally indicated at 60. The adjusting rod assembly 60 includes a threaded rod 66 that has a left end attached to the cantilever support 46 by a clevis 68. The right hand end of the threaded rod 66 extends through holes 70 and 72 in walls 76 and 78 of a square tubular upright support 80 that is anchored on the floor plate 40. As best seen in FIG. 3, a pack of beveled spring washers 82 are provided on the threaded rod 66 and are compressed between an adjusting nut 84 on the left side and a spherical washer 88, 90 that bears upon the wall 76 of the upright support 80.

As seen in FIGS. 1 and 2 of the drawings, the arcuate position of the cantilever support 46 will be determined by the distance between the cantilever support 46 and the upright support 80. Accordingly, adjusting the effective length of the threaded rod 66 will determine the position of the cantilever support 46 and will therefore determine the force with which the drive wheel 32 is applied against the skillet 14.

As seen in FIGS. 1, 2, and 3, the square tubular upright support 80 is welded to a square base plate 81 that will slide on the floor plate 40 but is held in place by a pair of stop blocks 83 and 85 that are bolted to the floor plate 40. A pivoting latch bar 86 is pivoted to the floor plate 40 by a pivot 87 and engages one side of the base plate 81 to hold the base plate stationary. However, the pivot 87 allows the latch bar 86 to be pivoted up and away from engagement with the base plate 81 so that the base plate 81 can then slide along the floor plate 40, as will be discussed further hereinafter.

In the adjusting operation, the length of the threaded rod 66 can be increased by rotating the adjusting nut 84 closer to the support 80, which will further compress the spring washers 82, and push the threaded rod 66 to the left and swing the cantilever support 46 to the left and thereby increase the pressure of the drive wheel 32 against the skillet 14. The compressive force that is stored in the beveled spring washers 82 will continuously urge the threaded rod 66 to the left and thereby apply the drive wheel 32 against the skillet 14. On the other hand, rotating the adjusting nut 84 to the left will decrease the compression on the beveled spring washers 82.

Referring again to FIG. 3, it will be understood that when a skillet 14 has traveled past the drive wheel 32, the spring washer pack 82 will abruptly urge the threaded rod 66 to the left as the drive wheel 32 is no longer engaging a skillet 14. A bushing 98 has a shank 100 that is press fit into the hole 72 in the support 80 and a flange 104 that engages with the wall 78 of the upright support 80. A lock nut 108 and jam nut 110 are threaded onto the threaded rod 66 on the right hand side of the support 80. The lock nut 108 is normally spaced away from the flange 104 by the distance of a gap 112. When the threaded rod 66 moves to the left, the lock nut 108 will engage with the flange 104 of bushing 98 and limit the leftward movement of the threaded rod 66 by the energy stored in the spring washers 82.

The Adjustment Tool

Referring to FIG. 3, a skillet drive adjustment tool is provided for use by the assembly plant maintenance staff to reliably adjust the adjusting rod 66 and the beveled spring washers 82 to provide the proper force of the drive wheel 32 against the skillet 14. The adjustment tool, generally indicated at 120, includes a tubular housing 122 that carries a plate 124 having legs 126 and 128 threaded thereto and locked in position by nuts 130 and 132. A piston 134 is slidable and rotatable within the tubular housing 122. A threaded stem 136 has a necked-down end 138 threaded into a hole 140 in the piston 134, and then the threaded stem 136 is welded to the piston 134 so that the piston 134 and threaded stem 136 are attached to one another. The threaded stem 136 extends out through the tubular housing 122 and has a hex head 144 on the end thereof by which the threaded stem 136 can be rotated to thread internal threads 142 of the piston 134 onto the rightward end of the adjusting rod 66 as shown in FIG. 3.

As seen in FIG. 3, a load cell transducer 150 is mounted on the threaded stem 136. A spherical washer 152, 154, is provided between the load cell transducer 150 and the tubular housing 122. A hex nut 158 is provided on the right end of the threaded stem 136 and is rotated to engage a ball bearing washer 162 against the load cell transducer 150. As seen in FIG. 3, tightening of the hex nut 158 will pull the threaded stem 136 and the adjusting rod 66 to the right as permitted by the yielding of the beveled spring washers 82. A digital transducer readout unit 166 is connected to the load cell transducer 150 and will display the pounds of force that is being applied to the adjusting rod 66 by the beveled spring washers 82.

Using the Adjustment Tool to Adjust the Skillet Drive

The adjustment tool 120 is mounted to the skillet drive assembly as shown in FIG. 3. The piston 134 is threaded onto the end of the adjusting rod 66 and the hex nut 158 is hand tightened so that the load cell 150 is captured between the tubular housing 122 and the hex nut 158. The digital readout unit 166 is set to zero. Then the operator tightens the hex nut 158 in the clockwise direction that will pull on the adjusting rod 66, moving the adjusting rod to the right and imposing a load on the load cell 150. The hex nut 158 is progressively tightened until the rightward movement of the adjusting rod 66 lifts the drive wheel 32 off of engagement with the skillet 14 by a fraction of an inch. When the drive wheel 32 is thus withdrawn, the digital readout unit 166 is read and will indicate the pounds of force that is then being imposed upon the adjusting rod 66 by the bias of the beveled spring washers 82.

Next, the operator will pivot the pivoting latch bar 86 up and away from engagement with the base plate 81 and will then swing the cantilever support 46 toward the right to thereby carry the drive wheel 32 fully away from the skillet 14 so that the adjusting rod 66 can be adjusted without any potential interference with the skillet 14.

Figure 4:
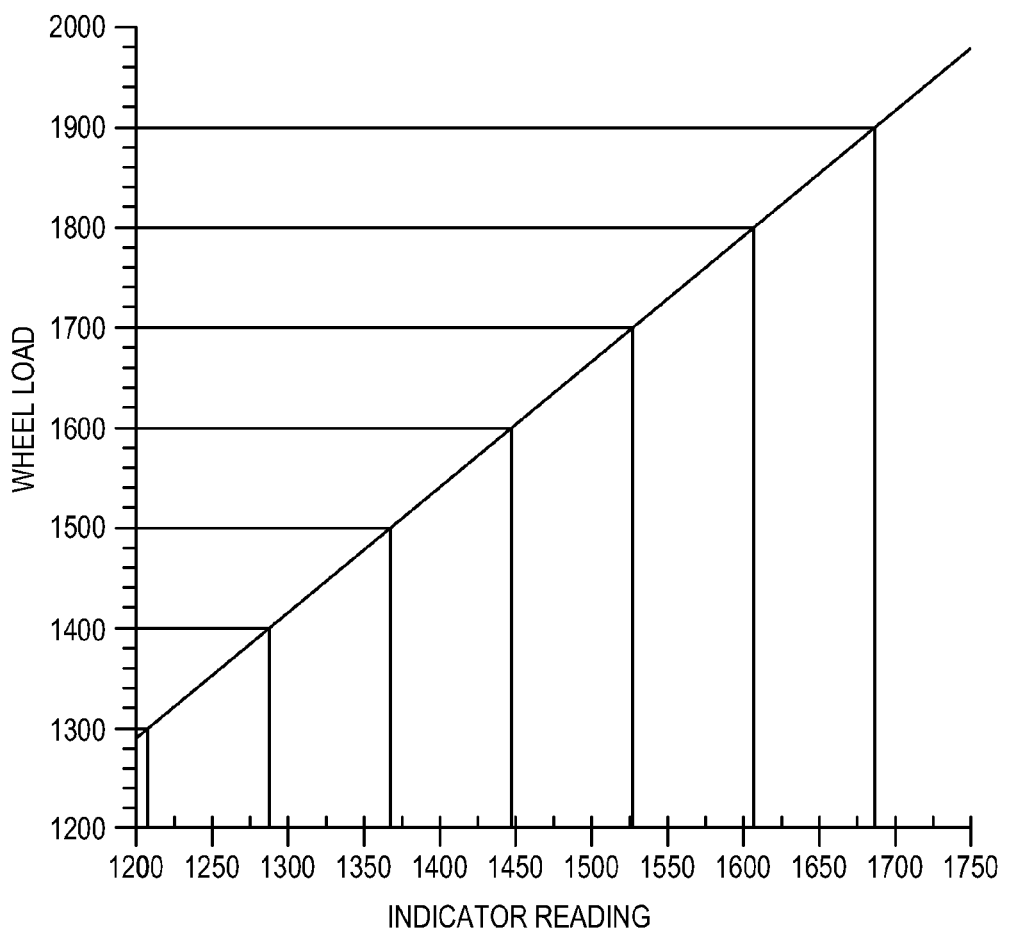
FIG. 4 is an example of a look up table that is used to translate load cell readings into wheel loads.

It will be understood that the force reading provided at the load cell 150 is actually different from the force with which the drive wheel 32 had been pressed against the skillet 14 because the beveled springs 82 have been compressed as the drive wheel 32 was lifted off the skillet 14 by the tightening of the hex nut 158. In addition, because the drive wheel 32 is made of a compressible urethane, the circumference of the drive wheel 32 is flattened against the surface of the skillet 14 when under pressure and therefore the perimeter will expand as the drive wheel 32 is withdrawn away from the skillet 14. Accordingly, the user is provided with a look-up table, FIG. 4 that is consulted in order to determine the proper force reading that should be read in order to provide a required loading of the drive wheel 32 against the skillet 14. For example, we see by consulting the look up table that if we need a wheel loading of 1500 pounds of force at the drive wheel, we should have a readout of 1340 lbs at the load cell 150. Once the operator determines that the readout should be at 1340 lbs., the adjusting rod 66 will be adjusted by rotating the adjusting nut 84 until the read out unit 166 indicates a reading of 1340 lbs. The look up table can be presented as a graph as shown in FIG. 4 or can be presented in the form of a columnar table where each indicator reading has a corresponding wheel load.

After the adjustment of the adjusting nut 84 has proceeded to provide the desired indicator reading on the digital readout unit 166, the lock nut 108 is adjusted in order to restore the desired dimension of the gap 112 between the lock nut 108 and the flange 104 of the bushing 98.

Next, the cantilever support 46 is swung to the left about its pivot axis 56 and the pivoting latch bar 86 is pivoted down into engagement with the base plate 81.

Thereafter, the hex nut 158 will be loosened so that the adjusting rod 66 will be urged to the left under the bias of the beveled spring washers 82. This will press the drive wheel 32 against the skillet 14, at the desired force of 1500 pounds of force that is needed to propel the skillet 14 through the vehicle assembly plant.

The adjustment tool 120 is removed from the skillet drive by unscrewing the piston 134 from the adjusting rod 66 and will be carried by the maintenance operator to the next drive that needs adjustment. It is preferable that the hex nut 158 and the ball washer 162 be removed from the adjusting rod 66 so that the load cell 150 can be removed from the tool and thereby protected against injury as the tool 120 is moved to the next skillet drive.

Thus it is seen a new and improved method and tool is provided for adjusting the force load of the drive wheel against the skillet.

What is claimed is:

1. A method for adjusting a skillet conveyor drive having a motor-driven drive wheel pressing against a skillet and mounted on an adjustable mounting mechanism including a threaded adjusting rod that is biased toward the skillet by a spring mechanism reacting against a fixed support and wherein the compression of the spring is adjusted by rotating an adjusting nut to obtain a pounds of force by which the drive wheel is forced against the skillet to obtain optimal operation of the skillet conveyor, said method comprising:
   providing an adjustment tool including a tubular housing, legs that support the tubular housing against the fixed support, a piston within the tubular housing and threadedly engaging the adjusting rod of the adjustable mounting mechanism, a threaded stem attached to the piston, a hex nut that is tightened to pull on threaded stem and thereby pull on the adjusting rod of the adjustable mounting mechanism, and a load cell that is interposed between the hex nut and the tubular housing to measure the force that is pulling on the adjusting rod;
   pulling on the adjusting rod via the adjusting tool to compress the spring mechanism just enough to move the drive wheel away from engagement with the skillet;
   measuring the pounds of force that was needed to pull the adjusting rod to move the drive wheel away from engagement with the skillet by reading the load cell;
   referring to a look up table that correlates a measured pounds of force at the condition in which the drive wheel is pulled away from engagement to the corresponding pounds of force that will be applied to the skillet when that compressive force is subsequently released by relieving the pulling on the adjusting rod by the adjusting tool to again let the drive wheel engage the skillet;
   and adjusting the adjusting nut as needed to adjust the measured pounds of force to that level which when the pulling of the adjusting rod is released will apply the drive wheel to the skillet at the pounds of force by which the drive wheel should be forced against the skillet to obtain optimal operation of the skillet conveyor.

2. The method of claim 1 further comprising the adjustment tool being removable from the adjusting rod so that the adjustment tool can be relocated to another skillet drive for use in adjusting that another skillet drive.

3. The method of claim 1 further comprising the look up table being a graph.

4. The method of claim 1 further comprising the look up table being a columnar table.

5. The method of claim 1 further comprising, after pulling on the adjusting rod to compress the spring mechanism just enough to move the drive wheel away from engagement with the skillet, then moving the skillet drive fully away from the skillet prior to the step of adjusting the adjusting nut.

\* \* \* \* \*